May 4, 1948.  L. HORNBOSTEL  2,440,718
PRESSURE GAUGE ASSEMBLY
Filed April 10, 1944  3 Sheets-Sheet 1
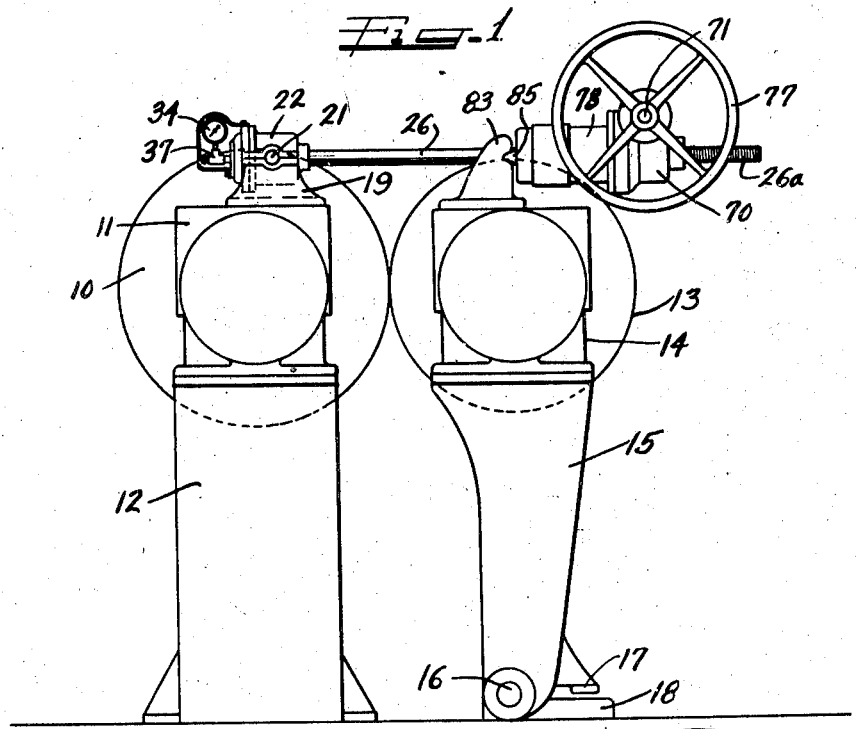
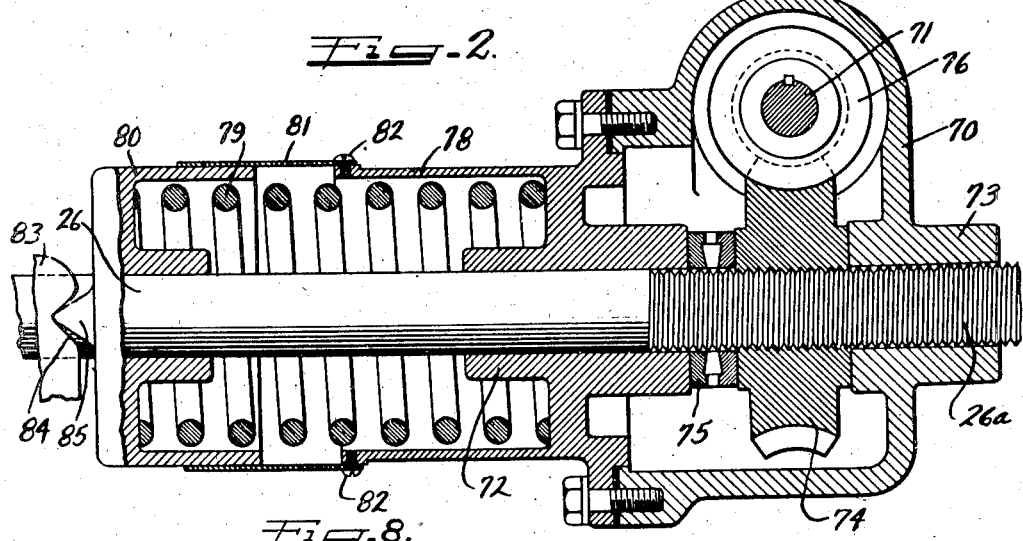
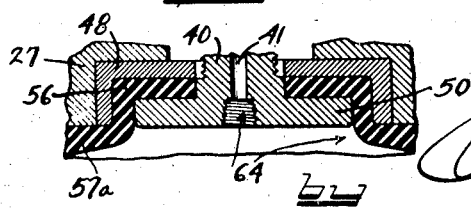
Inventor
LLOYD HORNBOSTEL.

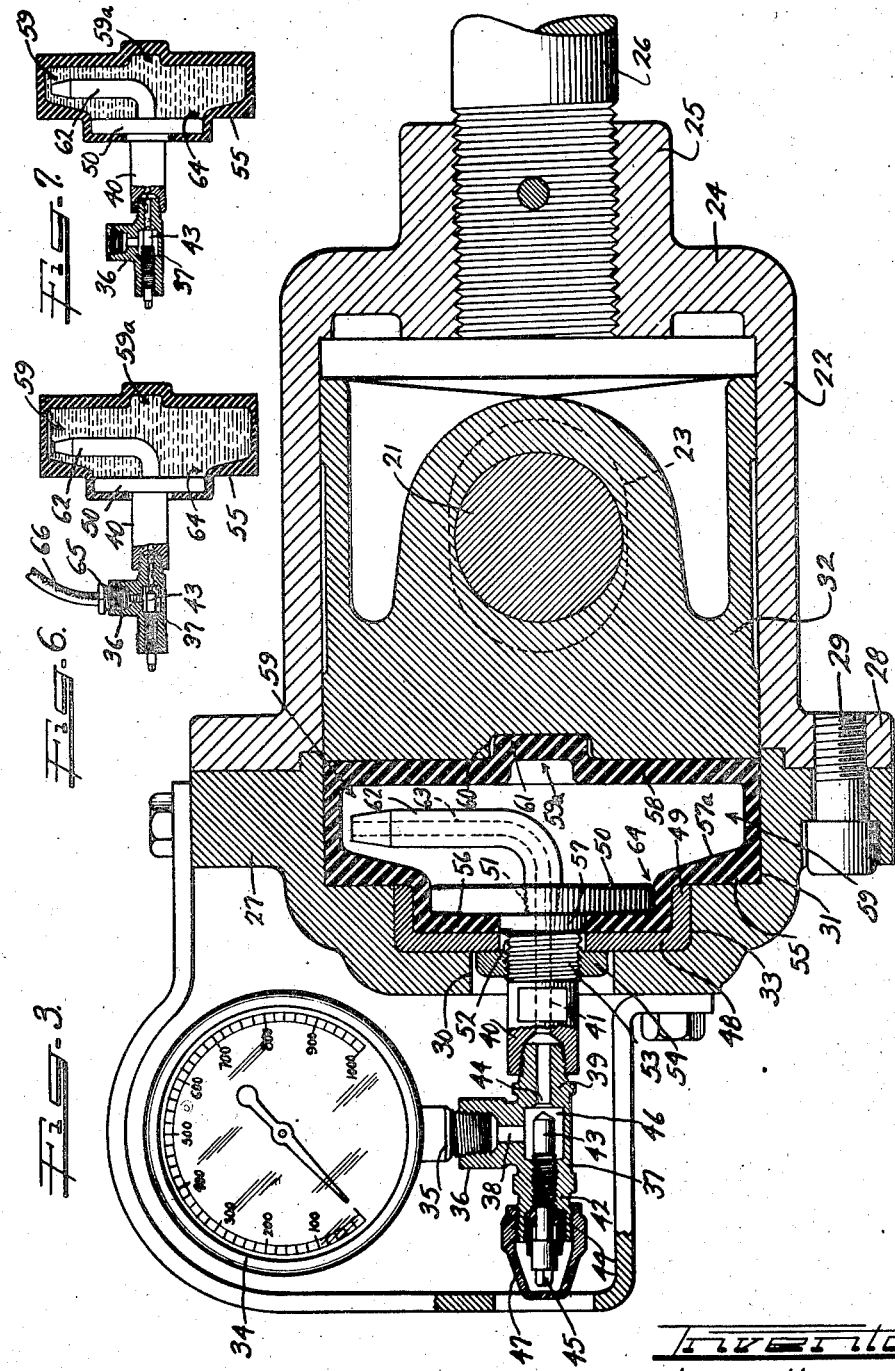

May 4, 1948.                L. HORNBOSTEL                2,440,718
                        PRESSURE GAUGE ASSEMBLY
                        Filed April 10, 1944          3 Sheets-Sheet 3

Lloyd Hornbostel.

Patented May 4, 1948

2,440,718

UNITED STATES PATENT OFFICE 2,440,718

PRESSURE GAUGE ASSEMBLY

Lloyd Hornbostel, Beloit, Wis., assignor to Beloit Iron Works, Beloit, Wis., a corporation of Wisconsin Application April 10, 1944, Serial No. 530,372

5 Claims. (Cl. 73—141)

This invention relates to a pressure gauge assembly and it is especially directed to a gauge assembly including a sack subjected to pressure, that is readily filled with liquid and purged of air to utilize non-compressible liquid as a pressure transfer medium to actuate a pressure gauge.

The invention is herein disclosed as applied to the pressure rolls of a paper making machine, but it is not intended to limit the structure to this type of machine since the improvements are equally applicable to many types of apparatus.

It is one of the principal objects of this invention to simplify the construction of a pressure gauge assembly such as contemplated herein and to improve the efficiency, operation and dependability of such assembly.

Another principal object hereof resides in providing a pressure gauge assembly wherein the device may be recharged with pressure fluid in the event there is leakage of the fluid from the structure, and to perform this operation without stopping the machine.

A further principal object of this invention is to provide a pressure gauge assembly that includes a pressure applying device comprising a resilient container or reservoir for the pressure fluid, to be acted upon by a pressure piston for operating the indicator on a gauge.

Another object hereof is to provide a pressure gauge assembly of the character above suggested wherein the resilient or elastic reservoir may be removed and replaced without shutting down the machine.

Still another object is to provide means whereby entrapped air may be evacuated from a receptacle for the hydraulic pressure fluid after the receptacle has been charged with the fluid.

Another object hereof resides in the provision of a pressure gauge assembly having an especially designed hydraulic pressure chamber or fluid reservoir that is of disk-like shape to be disposed with its axis in a plurality of angular positions depending upon the requirement of any particular installation. In this connection the reservoir has means incorporated in it for providing sumps to entrap air regardless of the position of the structure, thus facilitating the evacuation of the entrapped air during the replacement of the hydraulic fluid in the chamber or subsequent thereto.

It is a further object hereof to provide an elastic sack or bag that constitutes the hydraulic fluid reservoir, such sack or bag having an annular or peripheral sump and axial top and bottom sumps for entrapping air during the recharging of the container so that the air may be readily evacuated after the reservoir has been filled with fluid.

Another object resides in providing control means whereby the gauge or indicator unit may be removed for checking it or for replacement while the machine is in operation and without reducing the amount of pressure in the pressure fluid reservoir so that it will not effect the contacting relationship between the two pressure rollers.

The present invention also contemplates the provision of means in a pressure gauge assembly for maintaining the opposing rollers of a paper making machine in proper cooperation with respect to each other in the event of breakage of the indicator or gauge so that the machine may continue its operation even though the indicator is out of operation. Also the arrangement provides for the removal and replacement of the elastic sack or bag without interfering with the operation of the machine. In the instant assembly the rolls may be readily separated for various reasons and may then be restored to their desired opposing positions where they will be again pressed into opposition to each other under the same amount of pressure at which they were previously operating.

Additional objects, aims and advantages of the invention contemplated herein will be apparent to persons skilled in the art after the construction and operation of the pressure gauge assembly is understood from the within description.

It is preferred to accomplish the numerous objects of this invention and to practice the same in substantially the manner hereinafter fully described and as more particularly pointed out in the claims. Reference is now made to the accompanying drawings that are a part hereof.

Figure 1 is a front end elevation of a press roll unit for a paper making or other machine, showing the instrumentalities of the invention incorporated thereon;

Figure 2 is an enlarged vertical section through the axis of the thrust or pressure generating devices that are shown at the right upper portion of Figure 1;

Figure 3 is a vertical axial section through the pressure cylinder and piston along the plane of line 3—3 on Figure 5, showing the pressure chamber and fluid reservoir, the cylinder and the piston disposed with their axes horizontal;

Figure 6 is a sectional diagram taken axially through the elastic sack for the pressure fluid and showing the same expanded by the fluid and prior to the purging of the entrapped air therefrom;

Figure 7 is a similar diagram showing the sack restored to its operating position after the purging of the entrapped air therefrom; and Figure 8 is a fragmentary vertical cross-sectional view illustrating a portion of the sack and housing in vertical position.

The drawings will be understood as being more or less of a schematic character and are for the purpose of disclosing a typical or preferred form of the improvements contemplated herein.

Figure 5:
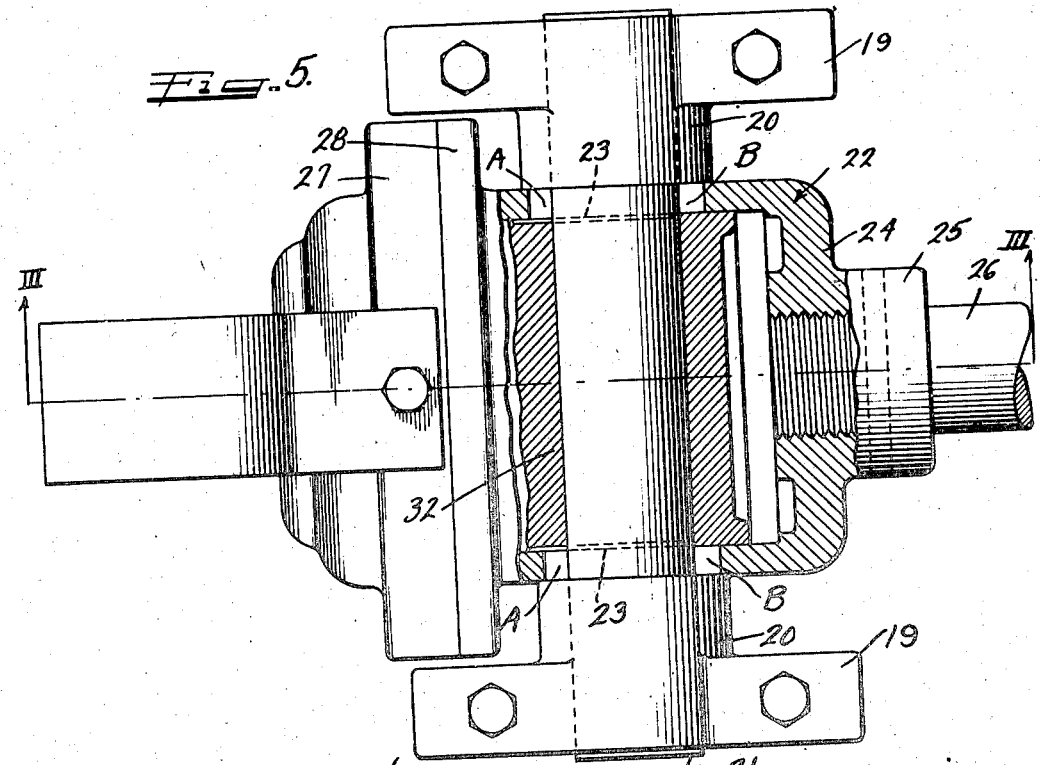
Figure 5 is a top plan of the structure shown in Figure 3 with portions thereof in horizontal section.

Referring first to Figure 1 it will be seen, the fixed roll 10 is carried in end bearings 11 on a stationary pedestal 12, and the movable roll 13 is carried in end bearings 14 on the upper ends of swinging supports 15 that are fulcrumed at their lower ends on a pivot rod 16. These swinging supports 15 are provided with shoes 17 adapted for engagement with the anchored bases 18 to prevent movement of the roll 13 and its supporting arms 15 too far away from the fixed roll 10. Spaced brackets 19, best shown in Figure 5, are bolted to the upper portions of the end bearings 11 for the fixed roll 10, and have bored bosses 20 to receive the ends of a wrist pin 21 that provides a support for at least a portion of the pressure gauge assembly.

The pressure gauge assembly comprises a hollow cylinder 22 the sides of which are provided with slots 23 that are of a width to accommodate the wrist pin 21 and are slightly longer than the diameter of said wrist pin to permit the cylinder to be moved transverse to the axis of the wrist pin.

The end of the cylinder that is nearest the movable roll 13 has an end wall 24 that is provided with a boss 25 having a threaded bore into which a thrust rod 26 is screwed and pinned. The other end of this thrust rod 26 extends to and beyond the pressure creating means that are mounted upon the movable roll end bearing 14 as shown in Figure 1. The other end of cylinder 22 is closed by a head 27 that is secured to the flanged end 28 of the cylinder by bolts 29. The interior of this head 27 is hollow and its outer axial portion is provided with a bore 30 that extends through it. The widest portion of the interior of the hollow head 27 comprises a compression chamber 31 that registers with and is of the same diameter as the interior bore of the cylinder 22 which permits the cooperating piston 32 to be disposed with its adjacent portion in this chamber. Between the chamber 31 and the open bore 30 of the head there is a reduced portion 33 that constitutes a seat for a portion of a pressure fluid reservoir.

The gauge device or indicator 34 may be of any suitable type and has a threaded stub 35 that is screwed into the lateral stub 36 of a T-coupling 37, and the bore 38 of said stub communicates with the longitudinal bore of the T-coupling. Another stub 39 of the T-coupling is exteriorly threaded and screwed into a tube 40 the bore 41 of which is in communication with the interior of the compression chamber 31 as will be later explained.

The third stub 42 of the coupling 37, that aligns with the stub 39, has a threaded bore to receive the threaded portion of a shut-off valve stem 43 that is adapted to be screwed into the coupling to engage a seat 44 at the adjacent inner end of the bore of the alined stub 39 to close the bore of said stub and prevent passage of pressure fluid from the compression chamber. The bore of stub 42 is enlarged at its outer end to receive a seal ring or gland washer 44 and the outer end of the valve stem 43 is provided with an angular portion 45 for turning said stem.

The valve stem 43 is employed to shut off flow of pressure fluid to the gauge whenever it is desired to replace the gauge or fill an elastic reservoir in the compression chamber 31, and the normal position of this valve stem is within the central enlarged portion 46 in the bore of the T-coupling. As shown in Figure 3, the outer end of the valve stem 43 projects beyond the coupling 37 and it is protected by a suitable cap 47 to prevent tampering with it.

Figure 4:
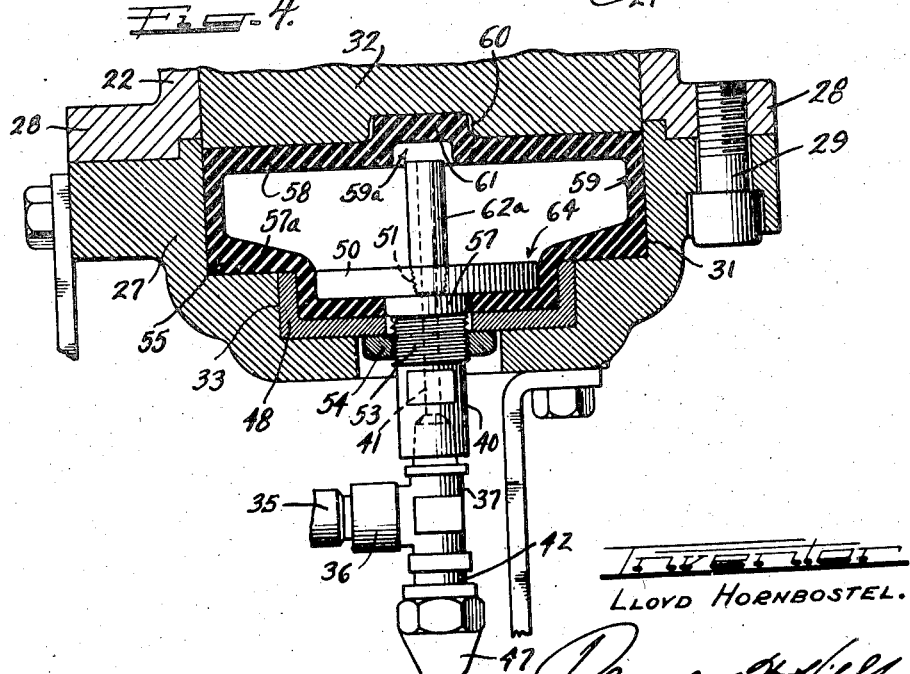
Figure 4 is a fragmentary view similar to Figure 3 showing the parts when their axes are in a vertical position.

The tube 40 is disposed in the open bore 30 of the cylinder head 27 as shown in Figures 3 and 4. The seat 33 in the cylinder head is adapted to receive a washer 48 having an edge flange 49, the exterior surfaces of said washer and flange being adapted to snugly fit the seat 33. The inner end of the tube 40 is enlarged to provide a disk 50 that has a threaded recess 51 of larger diameter than the bore 41 of the tube. The axial portion of the washer 48 has an opening 52 of larger diameter than the tube 40 and the adjacent portion of the tube is provided with threads 53 upon which a tightening nut 54 is screwed to draw the disk 50 of the tube toward the washer 48 and anchor it thereto.

An elastic fluid reservoir or sack 55 is disposed in the cylinder head in front of the piston 32 and is adapted to be compressed whenever there is relative movement between the cylinder and piston. This elastic reservoir or sack 55 may be of a suitable grade of rubber or synthetic rubber that is capable of withstanding the reaction of oil or other hydraulic fluid with which the reservoir is charged. The exterior surface of this reservoir is generally cylindrical and preferably it is a counterpart of the surfaces of the cylinder head that are engaged thereby when the reservoir is seated in the compression chamber 31. The elastic reservoir 55 has a flat outer neck portion 56 that is interposed between the disk 50 and the washer 48 and there is a central opening to surround an enlargement 57 on the adjacent portion of the tube 40 next the disk 50. When the tightening nut 54 is screwed up against the washer 48 the neck portion 56 of the reservoir will be securely held in position between the disk 50 and washer 48, as shown in Figures 3 and 4.

The interior of the elastic reservoir 55 is formed to provide a plurality of sumps wherein air will be entrapped during the charging of the reservoir with the hydraulic pressure medium. The inner surface 57a of the wall that extends away from the disk 50 is oblique so that a disk-shaped interior chamber increases in depth from the periphery toward the axis of the elastic reservoir or sack to provide a radially disposed annular sump 59. The axial portion of the circular inner wall 58 of the reservoir is recessed to provide an axial sump 59a and the proximate end face of piston 32, against which this inner wall 58 is engaged, has a depression 60 to receive an axial boss 61 projecting from the outer face of the reservoir wall 58 at the location of the axially disposed sump 59a. By reason of the particular arrangement just described, the elastic reservoir is shaped to form a counterpart of the surface of the compression chamber 31 and is fitted snugly therein so that it is affected by any relative movement between the piston and cylinder.

An L-shaped pipe 62 having a threaded end is screwed into the threaded recess 51 in the disk 50 and it has a bore 63 approximately the same diameter as the bore 51 of the tube 40 and is registered therewith. The free end of the pipe 62 in Figure 3 is positioned in the top segment of the annular sump 59 where it will be effective to evacuate entrapped air from the adjacent portion of the reservoir in the manner to be later described herein.

In the arrangement just described, the axis of cylinder 22 is horizontal, the dial 34 vertically disposed, and the pipe 62 has its end in the top of the reservoir to evacuate entrapped air therein, as shown in Figure 3. If the installation is such that the cylinder and other parts have their axes in a vertical plane wherein the dial 34 and its support 37 are pendant as shown in Figure 4, a straight tube 62a will be substituted in lieu of the angular tube 62 before described so that the end of this tube 62a will open into the axial sump 59a to evacuate the entrapped air therefrom. Should this last described arrangement be reversed to position the dial above the vertically disposed cylinder neither the pipe 62, nor the pipe 62a, will be employed. A sump 64, however, will be formed by the neck or throat portion of the elastic reservoir 55 and the threaded recess 51 which will be uppermost, as shown in Figure 8.

Whenever it is desired to replace the indicator device 34 or to remove it for repair, the valve stem 43 is screwed into its seat 44 to close the passageway 41 leading into the reservoir to retain the liquid therein under its operating pressure. The indicator 34 is removed from its socket 36 and repaired or replaced with another device.

When it is desired to replenish or recharge the liquid, the valve stem 43 is seated and the indicator removed so that a coupling 65 of the hose 66 of a pressure screw gun may be screwed into the stub 36 from which the indicator has been removed, (Figure 6). The valve stem 43 is now unseated and the pressure gun operated to discharge hydraulic liquid into the reservoir 55. It is preferred to force more liquid into the reservoir than is normally used during operation in order that all air or other compressible fluid can be purged from the system. In normal operation the wrist pin is midway between the ends of the recesses 23 and equal spaces A and B (Figure 5) are provided. When charging the sack with liquid as illustrated in Figure 6, sufficient liquid is introduced to stretch or deform the sack and this closes or decreases the space B between the pin 21 and end wall of the recess. When sufficient fluid has been discharged through the recess 51 or pipe 62 or pipe 62a (depending upon the position of the assembly) the valve stem 43 is again seated and the pressure gun hose uncoupled, whereupon the valve may be cracked to bleed back sufficient liquid for purging the air from the sack and for allowing the deformed or stretched sack to recede so as to reclaim the spaces B. The valve is again closed, the gauge screwed in position, and the valve opened to allow the fluid to act on the gauge.

The means for applying pressure to the cylinder and piston comprise the structure that is mounted upon the upper portion of the swinging support 14 for a movable roll 13, said means being shown generally in Figure 1 and in enlarged sectional detail in Figure 2. The arrangement comprises a gear housing 70 having bearings for a horizontal shaft 71 that is disposed with its axis transverse to the thrust or pressure rod 26 before described. The end portion of this rod passes through an inner bearing boss 72 and an outer bearing boss 73 on the housing 70, and intermediate these bosses the rod 26 has a worm gear 74 threaded on its portion 26a. A thrust roller bearing device 75 is interposed between the hub of the worm gear and the adjacent face of the bearing boss 72, and the other face of the worm gear 74 is engaged against the inner face of the bearing boss 73. A worm 76 is keyed or otherwise secured to the transverse shaft 71 in mesh with the worm gear 74 and said shaft 71 projects out of its front bearing and beyond the housing 70 where it has a hand wheel 77 secured to it for rotating said shaft and the gearing within the housing 70 to effect a longitudinal movement of the thrust rod 26.

The housing 70 has a casing portion 78 projecting beyond bearing 72 in a direction toward the pressure gauge assembly on the fixed roll support or bearing 11. A spring 79 is positioned within the casing 78 and projects beyond the outer end thereof to engage a follower device 80 that is carried by, but is free upon, the adjacent portion of the tension rod 26. This follower device 80 is hollow as shown in Figure 2 and it is spaced from the adjacent end of the casing 78. The space between the casing 78 and the follower 80 is closed by a shield 81 of cylindrical shape that is anchored to the casing by screws 82 and has its outer portion telescoped upon to slide on the outer surface of the cylindrical portion of the follower 80.

An abutment or stop 83 arises from the roll end bearing 14 and has a V-shaped recess 84 in its face next the follower 80. There are preferably two of these abutments or stops 83, one being on each side of the rod 26 to be engaged by spaced and tapered projections 85 on the end face of the follower that enter the recesses 84. This arrangement accommodates the tension or pressure creating devices to the swinging movement of the fulcrumed support 15 for the movable press roll 13.

By turning the hand wheel 77 in proper direction the worm gear 74 is adapted to wind upon the thread 26a of the thrust rod 26 in a direction so that the rod will exert a pull upon the cylinder 22 at its opposite end, tending to move the cylinder relative to the pin 21 and piston 32, thereby exerting pressure on the sack 55 tending to collapse the sack and flow liquid therein into the gauge 34 to indicate the pressure. This pull upon the rod 26 is transmitted through the gear housing 70 and spring 79 to the follower 80 that is engaged with the abutment or stop 83 on the fulcrumed support 14 for the movable press roll 13, and the latter will thereby be pressed toward and against the other roll 10 that has a fixed support. The turning of the hand wheel 77 is continued until the desired contact pressure has been attained between the rolls as indicated on the dial of the gauge.

The cylinder, piston and fluid reservoir have a common axis and the gauge assembly is adapted to be used in a variety of positions depending upon each particular installation, or upon the arrangement of the press rolls. In any of these positions there will be a sump 59, 59a, or 64 above the liquid in the reservoir 55. If the assembly is in a horizontal position, the bent tube 62 is used with the open end uppermost in the sump 59 as in Figure 3. If the assembly is vertical with the sack at the top, no tube is used since the recess will be uppermost as in Figure 8. If the assembly is vertical with the sack at the bottom the tube 62a is used to extend into sump 59a as in Figure 4. In each of these arrangements the sack can be completely filled with the non-compressible liquid and air can be purged out of the sack since it will always rise to the top sump at the mouth of the purge outlet.

As pointed out above, the slots 23 in the sides of the cylinder 22 are long enough to provide slight clearences A and B upon each side of the wrist pin 21. In the event the gauge device 34 is broken and the fluid should leak out, the wrist pin 21 will move over into the clearance A and there will be no further movement between the piston and cylinder but the pressure exerted by the thrust rod 26 will maintain the roll 13 in pressed contact with roll 10. In the event of rupture of the elastic reservoir 55 the same conditions will exist, and the machine will continue to operate with the rolls pressed together in the desired manner.

The manner of replacing the indicator device 34 and recharging the sack has hereinbefore been described, and it has been pointed out that these operations can be carried out without releasing the pressure rod 26. In the event of rupture of the sack 55, or if it is desired for any other reason to replace the sack, the cylinder head 27 is removed and the sack may be readily replaced in the head after it has been repaired or a new sack substituted for the one which has been broken. This operation likewise does not release the pressure rod, since the pin 21 will merely bear against the ends A of the recesses 23. The head and the parts assembled therewith are bolted back upon the cylinder and the hose 66 of the pressure screw gun is mounted in the manner shown in Figure 6 to recharge the sack with the pressure fluid as described above.

From the above descriptions it will be understood that the invention provides a pressure gauge assembly containing hydraulic liquid in a deformable sack for flowing the liquid to act on a pressure indicator. The sack has an inside contour arranged to collect any trapped air or other compressible fluid above the mouth of a purge tube, and a valve assembly is provided to seal fluid in the sack as well as to purge air from the sack. Liquid charging, air purging, and sack replacing operations can be accomplished without loss of tension or pressure exerted by the device embodying the assembly.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a pressure-applying device including a housing, a head on said housing, a piston in the housing and a pliable sack confined in the housing between the head and piston, the improvements of: a liquid-charging and air-purging conduit for said sack having a first open end in the uppermost portion of the sack and a second open end outside of the sack; a coupling having a first leg connected to said second end of the conduit, a second leg communicating with the first leg, and a valve seat between the first and second legs; a valve pin threaded in the wall of said coupling coacting with said seat; and said second leg constructed and arranged to alternately mount a pressure gauge and a liquid-charging gun whereby the valve can be opened to allow charging of the sack from the gun, then closed to seal liquid in the sack for removal of the gun, next cracked to purge air from the sack, again closed for mounting of the gauge and then opened for allowing the liquid to act on the gauge in response to pressure exerted on the sack.

2. In a pressure-applying device including a housing having openings in the side wall thereof, a piston slidable in the housing, a wrist pin on said piston projecting freely through the openings, a removable head on the housing and a liquid-retaining sack between the head and piston, the improvements of a liquid-charging and air-purging conduit having a first open end in the uppermost portion of the sack and a second open end outside of the sack and head, a coupling having a first leg secured to the second open end of the conduit, a second leg communicating with the first leg, and a valve seat between the first and second legs, a needle valve threaded in the wall of the coupling coacting with said seat, a pressure gauge communicating with said second leg, said sack being removable from the housing by removal of the head whereupon said wrist pin engages the walls of the housing openings to maintain the piston and housing in pressure-applying relation, and said valve being movable against said seat to seal liquid in the sack under pressure.

3. In a pressure-applying device including an open end housing, a head closing the open end, a piston in said housing, and a pliable fluid reservoir confined between and adapted to be compressed by relative movement of the piston and head, the improvements of; a fluid-charging and air-purging conduit for said sack having a first open end in the uppermost portion of the sack and a second open end outside said head, a T-coupling having a first leg connected to and communicating with the second open end of said conduit, a second leg at an angle to the first leg, a third leg aligned with the first leg, and a central chamber common to and communicating with the three legs of said coupling, a valve seat between the first and second legs, a valve pin threaded into the third leg coacting with said seat; and said second leg constructed and arranged to alternately mount a pressure gauge and a fluid-charging gun whereby the valve can be opened to allow charging of the reservoir from the gun, then closed to retain the fluid in the reservoir for removal of the gun, next cracked to purge air from the top of the reservoir, again closed for mounting of the gauge, and then opened for allowing the fluid to act on the gauge in response to pressure exerted on the sack.

4. A pressure responsive device comprising a generally cylindrically shaped, pliable, liquid containing reservoir adapted to be compressed by a force to be measured, said reservoir being provided with an annular sump in its inner peripheral surface and opposed central sumps in the inner end surfaces thereof, whereby one of said sumps is uppermost in any position of the reservoir to entrap included air in said uppermost sump, and whereby on release of such entrapped air, said reservoir is entirely filled with liquid.

5. A pressure responsive device comprising a deformable walled, fluid containing reservoir adapted to be compressed by a force to be measured, said reservoir having an opening for fluid charging and air purging, said reservoir being provided with a plurality of spaced sump portions in the inner surfaces thereof, said sumps being constructed and arranged so that in any selected position of said reservoir only one of said sump portions wil be upermost, whereby on release of entrapped air from said uppermost sump the reservoir is entirely filled with fluid.

LLOYD HORNBOSTEL.

REFERENCES CITED

The following references are of record in the file of this patent:

UNITED STATES PATENTS

| Number | Name | Date |
|---|---|---|
| 1,417,462 | Eason | May 23, 1922 |
| 1,424,888 | Eason | Aug. 8, 1922 |
| 1,523,526 | Hedges | Jan. 20, 1925 |
| 1,576,633 | Dix | Mar. 16, 1926 |
| 1,772,188 | Mason | Aug. 5, 1930 |
| 1,766,782 | Goldman | June 24, 1930 |
| 1,881,240 | Pentz | Oct. 4, 1932 |
| 2,260,135 | Beecher | Oct. 21, 1941 |
| 2,317,701 | Ullman | Apr. 27, 1943 |
| 2,364,443 | Hornbostel | Dec. 5, 1944 |

FOREIGN PATENTS

| Number | Country | Date |
|---|---|---|
| 2,638 | Great Britain | Feb. 11, 1892 |